(12) United States Patent
Zhu

(10) Patent No.: US 11,272,060 B2
(45) Date of Patent: Mar. 8, 2022

(54) TELECOMMUNICATION TRAFFIC ALLOCATION METHOD AND APPARATUS, AND ELECTRONIC DEVICE

(71) Applicant: Alipay (Hangzhou) Information Technology Co., Ltd., Zhejiang (CN)

(72) Inventor: Xiquan Zhu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/353,531

(22) Filed: Jun. 21, 2021

(65) Prior Publication Data
US 2022/0006902 A1    Jan. 6, 2022

(30) Foreign Application Priority Data
Jul. 3, 2020   (CN) .......................... 202010629922.4

(51) Int. Cl.
   *H04M 3/523*   (2006.01)
   *H04N 7/14*    (2006.01)
   *H04M 3/42*    (2006.01)

(52) U.S. Cl.
   CPC ..... *H04M 3/5233* (2013.01); *H04M 3/42382* (2013.01); *H04N 7/141* (2013.01);
   (Continued)

(58) Field of Classification Search
   None
   See application file for complete search history.

(56) References Cited

U.S. PATENT DOCUMENTS

| 6,704,409 | B1 * | 3/2004 | Dilip | ..................... H04M 3/523 379/243 |
| 9,894,201 | B1 | 2/2018 | Matula et al. | |

(Continued)

FOREIGN PATENT DOCUMENTS

| CN | 101662701 A | 3/2010 |
| CN | 103795875 A | 5/2014 |

(Continued)

*Primary Examiner* — Quynh H Nguyen
(74) *Attorney, Agent, or Firm* — Seed IP Law Group LLP

(57) ABSTRACT

Implementations of the present specification provide a telecommunication traffic allocation method and apparatus, and an electronic device. The method includes: determining a customer service agent that meets a response need of a traffic request, including: in response to that the traffic request is an audio interaction request or a video interaction request and that a customer service agent is currently processing an audio interaction or a video interaction, determining that the customer service agent does not meet the response need of the traffic request; in response to that the customer service agent is currently processing neither an audio interaction nor a video interaction, and that a processing volume corresponding to a text interaction being processed by the customer service agent does not exceed a first processing volume upper limit, determining that the customer service agent meets the response need of the traffic request; and allocating telecommunication traffic corresponding to the traffic request to a customer service agent that meets the response need. In the method according to an implementation of the present specification, the unified allocation of audio interactions, video interactions, and text interactions can be implemented, thereby improving the efficiency of customer service traffic processing, reducing the amount of customer service human resources occupied by a remote customer service, and reducing operating costs of the remote customer service.

20 Claims, 6 Drawing Sheets

(52) U.S. Cl.
CPC .... *H04M 2201/39* (2013.01); *H04M 2201/50* (2013.01); *H04M 2203/252* (2013.01)

(56) References Cited

U.S. PATENT DOCUMENTS

| | | |
|---|---|---|
| 2006/0203993 A1 | 9/2006 | Busey et al. |
| 2018/0376003 A1 | 12/2018 | Shinseki |

FOREIGN PATENT DOCUMENTS

| | | |
|---|---|---|
| CN | 106341562 A | 1/2017 |
| CN | 109151231 A | 1/2019 |
| CN | 110740218 A | 1/2020 |

\* cited by examiner

TELECOMMUNICATION TRAFFIC ALLOCATION METHOD AND APPARATUS, AND ELECTRONIC DEVICE

BACKGROUND

Technical Field

The present specification relates to the technical field of smart terminals, and in particular, to a telecommunication traffic allocation method and apparatus, and an electronic device.

Description of the Related Art

In application scenarios of the existing technologies, remote customer service methods are substantially divided into two types: online services and hotline services.

The online services solve user problems based on text interactions through instant messaging, and the hotline services solve user problems based on audio interactions through voice calls.

Generally, the online services and the hotline services are two sets of systems, which are independent of each other, so in the process of the online services and the hotline services, a customer service agent usually can only play one role at a certain time, and either perform text interaction communication with a user as an online customer service agent or answer user calls as a hotline customer service agent. This makes remote customer services require a large amount of customer service human resources to implement quick feedback corresponding to user problems, which greatly increases operating costs of remote customer services.

BRIEF SUMMARY

Implementations of the present specification provide a telecommunication traffic allocation method and apparatus, and an electronic device, as well as a computer-readable storage medium.

The implementations of the present specification use the following technical solutions.

According to a first aspect, an implementation of the present specification provides a telecommunication traffic allocation method, including: in response to that a traffic request is an audio interaction request or a video interaction request and that a customer service agent is currently processing an audio interaction or a video interaction, determining that the customer service agent does not meet a response need of the traffic request; in response to that the traffic request is an audio interaction request or a video interaction request and that the customer service agent is currently processing neither an audio interaction nor a video interaction, invoking a predetermined first processing volume upper limit, and determining that the customer service agent meets the response need of the traffic request in response to that a processing volume corresponding to a text interaction being processed by the customer service agent does not exceed the first processing volume upper limit; and allocating telecommunication traffic corresponding to the traffic request to a customer service agent that meets the response need.

In an example implementation of the first aspect, the method further includes: in response to that the traffic request is a text interaction request and that the customer service agent is currently processing an audio interaction or a video interaction, invoking the first processing volume upper limit, and determining that the customer service agent meets the response need of the traffic request in response to that a sum of a processing volume corresponding to a text interaction corresponding to the traffic request and a processing volume corresponding to a text interaction being processed by the customer service agent does not exceed the first processing volume upper limit.

In an example implementation of the first aspect, the method further includes: in response to that the traffic request is a text interaction request and that the customer service agent is currently processing neither an audio interaction nor a video interaction, invoking a predetermined second processing volume upper limit, and determining that the customer service agent meets the response need of the traffic request in response to that a sum of a processing volume corresponding to a text interaction corresponding to the traffic request and a processing volume corresponding to a text interaction being processed by the customer service agent does not exceed the second processing volume upper limit.

In an example implementation of the first aspect: the first processing volume upper limit includes an upper limit of an audio text processing volume and an upper limit of a video text processing volume; or, the first processing volume upper limit includes an upper limit of an audio and video text processing volume.

In an example implementation of the first aspect: the first processing volume upper limit includes a first text interaction upper limit; and in response to that the traffic request is an audio interaction request or a video interaction request and that the customer service agent is currently processing neither an audio interaction nor a video interaction, the determining whether the processing volume corresponding to a text interaction being processed by the customer service agent exceeds the first processing volume upper limit includes determining whether a number of all text interactions being processed by the customer service agent exceeds the first text interaction upper limit.

In an example implementation of the first aspect, the first processing volume upper limit includes an upper limit of a first text interaction weight; and in response to that the traffic request is an audio interaction request or a video interaction request and that the customer service agent is currently processing neither an audio interaction nor a video interaction, the determining whether a processing volume corresponding to all text interactions being processed by the customer service agent exceeds the first processing volume upper limit includes determining whether a total text interaction weight of the customer service agent exceeds the upper limit of the first text interaction weight, where the total text interaction weight of the customer service agent is a sum of weights of all text interactions currently being processed by the customer service agent, different types of text interactions having different weights.

In an example implementation of the first aspect, the allocating the telecommunication traffic corresponding to the traffic request to a customer service agent that meets the response need comprises: determining all customer service agents that meet the response need among customer service agents in an enabled state, and allocating a telecommunication traffic corresponding to the traffic request to a customer service agent having a highest traffic processing priority among all the customer service agents that meet the response need.

In an example implementation of the first aspect, the allocating the telecommunication traffic corresponding to the traffic request to a customer service agent that meets the response need includes: determining whether customer service agents in an enabled state meet the response need one by one based on a predetermined sequence, and allocating telecommunication traffic corresponding to the traffic request to a first customer service agent determined as meeting the response need in the predetermined sequence.

In an example implementation of the first aspect, the method further includes: before the allocating the telecommunication traffic corresponding to the traffic request to a customer service agent that meets the response need, in response to a traffic request, determining whether there is a designated customer service agent for the traffic request; in response to that there is a designated customer service agent, determining whether the designated customer service agent meets the response need; and in response to that the designated customer service agent meets the response need, allocating the telecommunication traffic corresponding to the traffic request to the designated customer service agent.

In an example implementation of the first aspect, the method further includes: initiating a waiting request and/or a customer service agent replacement request in response to that the designated customer service agent does not meet the response need.

According to a second aspect, an implementation of the present specification provides a telecommunication traffic allocation apparatus, including: a customer service agent selection module, configured to determine a customer service agent that meets a response need of a traffic request, including: a first determining sub-module, configured to, in response to that the traffic request is an audio interaction request or a video interaction request and that the customer service agent is currently processing an audio interaction or a video interaction, determine that a customer service agent does not meet the response need of the traffic request; a second determining sub-module, configured to, in response to that the traffic request is an audio interaction request or a video interaction request and that the customer service agent is currently processing neither an audio interaction nor a video interaction, invoke a predetermined first processing volume upper limit, and determine that the customer service agent meets the response need of the traffic request in response to that a processing volume corresponding to a text interaction being processed by the customer service agent does not exceed the first processing volume upper limit; and a telecommunication traffic allocation module, configured to allocate telecommunication traffic corresponding to the traffic request to a customer service agent that meets the response need.

According to a third aspect, an implementation of the present specification provides an electronic device, including a memory for storing computer program instructions and a processor for executing the program instructions, where in response to that the computer program instructions are executed by the processor, the electronic device is triggered to perform the steps of the method according to the first aspect.

According to a fourth aspect, an implementation of the present specification provides a computer-readable storage medium storing a computer program, where in response to that the computer program runs on a computer, the computer is caused to perform the method according to the first aspect.

The above technical solutions proposed in the implementations of the present specification can achieve at least the following technical effects.

In the method according to an implementation of the present specification, the unified allocation of audio interactions, video interactions, and text interactions can be implemented, and a customer service agent implements parallel processing of audio and video interactions and text interactions without reducing customer experience, thereby improving the efficiency of customer service traffic processing, reducing the amount of customer service human resources occupied by a remote customer service, and reducing operating costs of the remote customer service.

DETAILED DESCRIPTION

Figure 1:
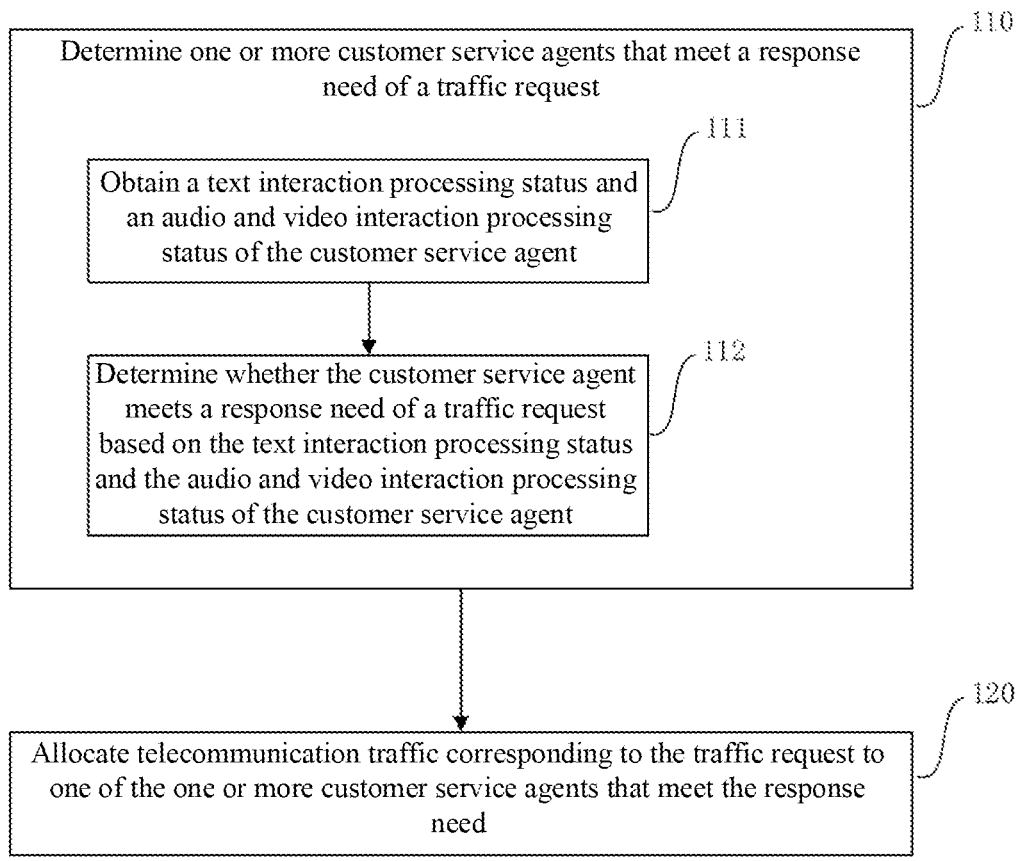
FIG. 1 illustrates a flowchart illustrating an implementation of a telecommunication traffic allocation method according to the present specification.

In order to make the objects, technical solutions and advantages of the present specification clearer, the technical solutions of the present specification are clearly and completely described below in conjunction with specific implementations of the present specification and the corresponding accompanying drawings. Clearly, the described implementations are merely some rather than all of the implementations of the present specification. Based on the implementations of the present specification, all other implementations derived by a person of ordinary skill in the art without creative efforts shall fall within the protection scope of the present specification.

The terms used in the implementation part of the present specification are merely used to explain specific implementations of the present specification, and are not intended to limit the present specification.

In view of the problems in the existing technologies, e.g., remote customer services occupying excessive customer service human resources, implementations of the present specification provide a telecommunication-based customer service traffic ("traffic") allocation method. In the conception of the method of the implementation of the present specification, the inventors first analyzed example application scenarios of online services and hotline services. In the example application scenarios of the online services and the hotline services, one of the main reasons that remote customer services occupy excessive customer service human resources is the low utilization rate of customer service agents. In theory, a customer service agent can handle text interaction tasks while making a voice call. However, in the example application scenarios of the online services and the hotline services, because the online services and the hotline services are two sets of systems, which are independent of each other, in the process of the online services and the hotline services, a customer service agent usually can only play one role at a certain time, and either perform text interaction communication with a user as an online customer service agent or answer user calls as a hotline customer service agent. As a result, a customer service agent cannot process in parallel text interactions of online services and audio interactions of hotline services. In view of this problem, in one implementation of the present specification, a method for uniformly allocating text interactions of online customer services and audio interactions of hotline customer services to customer service agents is provided, so the text interactions of the online customer services and the audio interactions of the hotline customer services can be processed in parallel during work of the customer service agents, and traffic processing efficiency of customer service agents is improved, thereby saving customer service human resources occupied by remote customer services.

For example, in an implementation of the present specification, in response to that unified telecommunication traffic allocation is performed, an example scenario of a customer service agent's traffic processing is analyzed.

Generally, during an audio interaction, the customer service agent and a customer interact through a voice dialog, and the interaction rhythm of the voice interaction is relatively fast. During the voice interaction process, in response to that the customer service agent switches between different audio interactions, the customer will have an obvious feeling of waiting, reducing the user experience. Moreover, since the audio interaction cannot display a historical interaction record like the text interaction, in response to that the customer service agent switches between different audio interactions, it is easy to make a mistake about interaction objects and send a voice message, to customer B, that should have been sent to customer A. Therefore, when processing an audio interaction, the customer service agent can no longer undertake other audio interactions.

Furthermore, with the popularization of the network video technology, a video interaction as a new remote service method gradually becomes popular. Similar to the audio interaction, the processing of the video interaction is also exclusive of the same kind. In the process of the video interaction, in response to that the customer service agent switches between different video interactions, it will cause the video interaction to be interrupted intermittently or cause one customer to see a video picture of the customer service agent interacting with another customer, which will greatly reduce the user experience.

Therefore, in the method of an implementation of the present specification, in response to that telecommunication-based customer service traffic is allocated to a customer service agent, and that the customer service agent is processing an audio interaction or a video interaction, no new audio interaction or video interaction is to be allocated to the customer service agent.

Further, because the interactive ways of the audio interaction and the text interaction do not interfere with each other, and the interactive ways of the video interaction and the text interaction do not interfere with each other, a customer service agent can process the text interaction in parallel when processing the audio interaction or the video interaction.

Therefore, in the method of an implementation of the present specification, in response to that telecommunication-based customer service traffic is allocated to a customer service agent, and that the customer service agent is processing an audio interaction or a video interaction, a new text interaction can be allocated to the customer service agent. Or, in response to that telecommunication traffic is allocated to a customer service agent, and that the customer service agent is processing a text interaction and processing no audio interaction or video interaction, a new audio interaction or video interaction can be allocated to the customer service agent.

Further, when processing a text interaction, a customer service agent interacts with a customer through text; and in the text interaction process, there is a certain amount of time consumed for customer input; and moreover, the customer can also accept a certain amount of time consumed for input by the customer service agent. By using the time consumed for customer input and actively prolonging the time consumed for input by the customer service agent in a text interaction, the customer service agent can switch to another text interaction for processing without making the customer have an obvious feeling of waiting, which is equivalent to that one customer service agent can process in parallel a plurality of text interactions with different customers.

Therefore, in the method of an implementation of the present specification, in response to that telecommunication traffic is allocated to a customer service agent, and that the customer service agent is processing a text interaction, a new text interaction can be allocated to the customer service agent.

Further, although one customer service agent can process in parallel a plurality of text interactions with different customers, the processing capacity of the customer service agent has an upper limit. In response to that there are more text interactions simultaneously processed by the customer service agent, it means a longer total processing duration. Then a customer corresponding to a text interaction will have a longer waiting duration in the text interaction process, and a too long waiting time will lead to a decrease in customer experience. Moreover, in response to that there are excessive text interactions simultaneously processed by the customer service agent, there is the possibility of processing confusion, which increases the probability of traffic processing errors.

Therefore, in order to avoid a long waiting duration or processing errors in the text interaction process that result in a decrease in customer experience, in an implementation of the present specification, a maximum processing volume is set, so in response to that text interactions are allocated to the customer service agent, it is ensured that a processing volume corresponding to a text interaction processed by the customer service agent does not exceed a predetermined maximum processing volume.

Further, in an example application scenario, a processing volume corresponding to text interactions that a customer service agent can process in parallel in response to that the customer service agent is processing an audio interaction or a video interaction is different from a processing volume corresponding to text interactions that can be processed in parallel in response to that the customer service agent processes the text interactions only. Therefore, in an implementation of the present specification, the maximum processing volume of text interactions in response to that an audio interaction or a video interaction is processed and the maximum processing volume of text interactions in response to that only the text interactions are processed are set for a customer service agent. In response to that telecommunication traffic is allocated to the customer service agent, it is ensured that the processing volume corresponding to text interactions that the customer service agent processes in parallel when processing an audio interaction or a video interaction does not exceed a predetermined maximum processing volume of text interactions when an audio interaction or a video interaction is processed, so as to ensure that the processing volume corresponding to text interactions that the customer service agent processes in parallel when processing only the text interactions does not exceed a predetermined maximum processing volume of text interactions in response to that only the text interactions are processed.

In the method of an implementation of the present specification, the unified allocation of audio interactions, video interactions, and text interactions can be implemented, and a customer service agent implements parallel processing of audio and video interactions (at least one of audio interactions or video interactions) and text interactions without reducing customer experience, thereby improving the efficiency of customer service traffic processing, reducing the amount of customer service human resources occupied by a remote customer service, and reducing operating costs of the remote customer service.

The technical solutions according to the implementations of the present specification are described in detail below with reference to the accompanying drawings.

FIG. 1 illustrates a flowchart illustrating an implementation of a telecommunication traffic allocation method according to the present specification. As shown in FIG. 1, in an implementation of the present specification, the telecommunication traffic allocation method includes the following processes.

Step 110: In response to a traffic request, determine one or more customer service agents that meet a response need of the traffic request. Step 120: Allocate telecommunication traffic corresponding to the traffic request to one of the one or more customer service agents that meet the response need.

For example, in the method of an implementation of the present specification, telecommunication traffic has three types: an audio interaction, a video interaction, and a text interaction, where the audio interaction and the video interaction can be collectively referred to as an audio and video interaction. The traffic request includes three types: an audio interaction request, a video interaction request, and a text interaction request.

In an implementation of step 110, step 110 includes the following steps.

Step 111: Obtain a current text interaction processing status and audio and video interaction processing status of a customer service agent.

Step 112: Determine whether the customer service agent meets the response need of the traffic request based on the text interaction processing status and the audio and video interaction processing status of the customer service agent.

For example, in an implementation of step 112, whether the customer service agent meets the response need of the traffic request is determined based on the following determining strategy: in response to that the traffic request is an audio interaction request or a video interaction request and that the customer service agent is currently processing an audio interaction or a video interaction, determining that the customer service agent does not meet the response need of the traffic request; and in response to that the traffic request is an audio interaction request or a video interaction request and that the customer service agent is currently processing neither an audio interaction nor a video interaction, invoking a predetermined first processing volume upper limit, and determining that the customer service agent meets the response need of the traffic request in response to that a processing volume corresponding to a text interaction being processed by the customer service agent does not exceed the first processing volume upper limit.

Further, in an implementation of step 112, whether the customer service agent meets the response need of the traffic request is determined further based on the following determining strategy: in response to that the traffic request is a text interaction request and that the customer service agent is currently processing an audio interaction or a video interaction, invoking the first processing volume upper limit, and determining that the customer service agent meets the response need of the traffic request in response to that a sum of a processing volume corresponding to a text interaction corresponding to the traffic request and a processing volume corresponding to a text interaction being processed by the customer service agent does not exceed the first processing volume upper limit.

Further, in an implementation of step 112, whether the customer service agent meets the response need of the traffic request is determined further based on the following determining strategy: in response to that the traffic request is a text interaction request and that the customer service agent is currently processing neither an audio interaction nor a video interaction, invoking a predetermined second processing volume upper limit, and determining that the customer service agent meets the response need of the traffic request in response to that a sum of a processing volume corresponding to a text interaction corresponding to the traffic request and a processing volume corresponding to a text interaction being processed by the customer service agent does not exceed the second processing volume upper limit.

Figure 2:
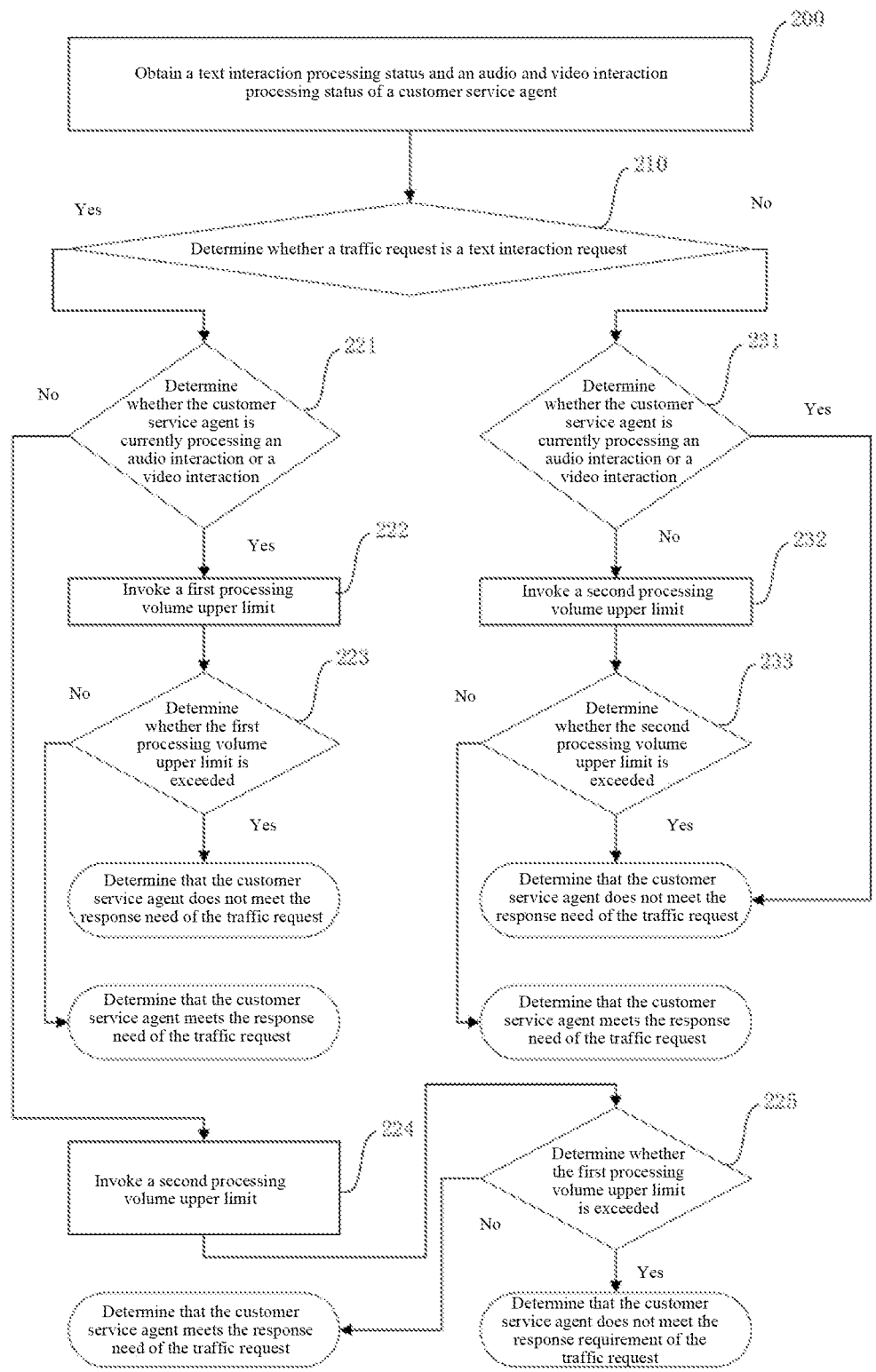
FIG. 2 illustrates a partial flowchart illustrating an implementation of a telecommunication traffic allocation method according to the present specification.

For example, FIG. 2 illustrates a partial flowchart illustrating an implementation of a telecommunication traffic allocation method according to the present specification. As shown in FIG. 2, in an implementation of the present specification, determining whether a customer service agent meets a response need of a traffic request includes the following processes.

Step 200: Obtain a text interaction processing status and an audio and video interaction processing status of a customer service agent.

Step 210: Determine whether a traffic request is a text interaction request; and in response to that the traffic request is a text interaction request, perform step 221.

Step 221: Determine whether the customer service agent is currently processing an audio interaction or a video interaction; and in response to that the customer service agent is currently processing an audio interaction or a video interaction, perform step 222.

Step 222: Invoke a first processing volume upper limit.

Step 223: Determine, based on the text interaction processing status of the customer service agent, whether a sum of a processing volume corresponding to a text interaction being processed by the customer service agent and a processing volume corresponding to a text interaction corresponding to the traffic request exceeds the first processing volume upper limit; in response to that a sum exceeds the first processing volume upper limit, determine that the customer service agent does not meet the response need of the traffic request; in response to that a sum does not exceed the first processing volume upper limit, determine that the customer service agent meets the response need of the traffic request; and in response to that the customer service agent is currently processing neither an audio interaction nor a video interaction, perform step 224.

Step 224: Invoke a second processing volume upper limit.

Step 225: Determine, based on the text interaction processing status of the customer service agent, whether a sum of a processing volume corresponding to a text interaction being processed by the customer service agent and a processing volume corresponding to a text interaction corresponding to the traffic request exceeds the second processing volume upper limit; in response to that a sum exceeds the second processing volume upper limit, determine that the customer service agent does not meet the response need of the traffic request; in response to that a sum does not exceed the second processing volume upper limit, determine that the customer service agent meets the response need of the traffic request; and in response to that the traffic request is not a text interaction request, perform step 231.

Step 231: Determine whether the customer service agent is currently processing an audio interaction or a video interaction; and in response to that the customer service agent is currently processing an audio interaction or a video interaction, determine that the customer service agent does not meet the response need of the traffic request; and in response to that the customer service agent is currently processing neither an audio interaction nor a video interaction, perform step 232.

Step 232: Invoke a first processing volume upper limit.

Step 233: Determine, based on the text interaction processing status of the customer service agent, whether a sum of a processing volume corresponding to a text interaction being processed by the customer service agent exceeds the first processing volume upper limit; in response to that a sum exceeds the first processing volume upper limit, determine that the customer service agent does not meet the response need of the traffic request; in response to that a sum does not exceed the first processing volume upper limit, determine that the customer service agent meets the response need of the traffic request.

Further, in an implementation of the present specification, the processing volume upper limit is set by setting the upper limit of a number of text interactions. For example, the text interaction processing status includes a number of text interactions, where a number of text interactions of the customer service agent is a number of text interactions currently being processed by the customer service agent; in response to that the traffic request is an audio interaction request or a video interaction request and that the customer service agent is currently processing neither an audio interaction nor a video interaction, whether a processing volume corresponding to a text interaction being processed by the customer service agent exceeds the first processing volume upper limit is determined based on whether a number of text interactions of the customer service agent exceeds a first text interaction upper limit in the first processing volume upper limit; in response to that the traffic request is a text interaction request and that the customer service agent is currently processing an audio interaction or a video interaction, whether a sum of a processing volume corresponding to a text interaction corresponding to the traffic request and a processing volume corresponding to a text interaction being processed by the customer service agent exceeds the first processing volume upper limit is determined based on whether a sum of a number of text interactions being processed by the customer service agent plus 1 exceeds the first text interaction upper limit in the first processing volume upper limit; and in response to that the traffic request is a text interaction request and that the customer service agent is currently processing neither an audio interaction nor a video interaction, whether a sum of a processing volume corresponding to a text interaction corresponding to the traffic request and a processing volume corresponding to a text interaction being processed by the customer service agent exceeds the second processing volume upper limit is determined based on whether a sum of a number of text interactions being processed by the customer service agent plus 1 exceeds a second number of text interactions in the second processing volume upper limit.

For example, assume that the customer service agent can process up to 2 text interactions in parallel when processing an audio interaction or a video interaction, and can process up to 4 text interactions in parallel when processing neither an audio interaction nor a video interaction, the first text interaction upper limit in the first processing volume upper limit is set to 2, and the second number of text interactions in the second processing volume upper limit is set to 4.

Assume that there is a new audio interaction, in response to that the customer service agent is currently processing an audio interaction or a video interaction, the customer service agent does not have the capability of processing the new audio interaction, and does not meet the response need of the traffic request; in response to that there is no audio interaction or video interaction currently being processed by the customer service agent but the customer service agent is processing 4 text interactions in parallel, the processing volume (4 text interactions) corresponding to text interactions processed by the customer service agent exceeds the first processing volume upper limit (2 text interactions), so the customer service agent still does not have the capability of processing new audio interactions, and does not meet the response need of the traffic request; and in response to that there is no audio interaction or video interaction currently being processed by the customer service agent, and the customer service agent is processing 2 text interactions in parallel, the processing volume (2 text interactions) corresponding to text interactions processed by the customer service agent does not exceed the first processing volume upper limit (2 text interactions), so the customer service agent has the capability of processing new audio interactions and meets the response need of the traffic request.

Assume that there is a new text interaction currently, in response to that the customer service agent is processing an audio interaction or a video interaction, and the customer service agent is processing 1 text interaction in parallel at the same time, a sum of the processing volume (1 text interaction) corresponding to the text interaction corresponding to the traffic request and the processing volume (1 text interaction) corresponding to the text interaction being processed by the customer service agent does not exceed the first processing volume upper limit (2 text interactions), so the customer service agent has the capability of processing new audio interactions and meets the response need of the traffic request; in response to that the customer service agent is currently processing an audio interaction or a video interaction, and is processing 2 text interactions in parallel at the same time, a sum of the processing volume (1 text interaction) corresponding to the text interaction corresponding to the traffic request and the processing volume (2 text interactions) corresponding to the text interactions being processed by the customer service agent exceeds the first processing volume upper limit (2 text interactions), so the customer service agent does not have the capability of processing new audio interactions and does not meet the response need of the traffic request; in response to that the customer service agent is currently processing neither an audio interaction nor a video interaction, and is processing 2 text interactions in parallel at the same time, a sum of the processing volume (1 text interaction) corresponding to the text interaction corresponding to the traffic request and the processing volume (2 text interactions) corresponding to the text interactions being processed by the customer service agent does not exceed the second processing volume upper limit (4 text interactions), so the customer service agent has the capability of processing new audio interactions and meets the response need of the traffic request; and in response to that the customer service agent is processing neither an audio interaction nor a video interaction, and is processing 4 text interactions in parallel at the same time, a sum of the processing volume (1 text interaction) corresponding to the text interaction corresponding to the traffic request and the processing volume (4 text interactions) corresponding to the text interactions being processed by the customer service agent exceeds the second processing volume upper limit (4 text interactions), so the customer service agent does not have the capability of processing new audio interactions and does not meet the response need of the traffic request.

Further, in some application scenarios, processing different types of text interactions takes up different efforts of the customer service agent.

Then, in response to that the types of text interactions are different, a number of text interactions that the customer service agent can process in parallel is also different.

For example, in response to that a text interaction is performed for comments and complaints, a customer service agent needs to record a target of complaint in detail and verify the content of the complaint; in response to that a text interaction is performed for logistics queries, the customer service agent only needs to search for logistics information and copy and paste it; and therefore, the processing of the text interaction for comments and complaints takes up more energy of the customer service agent than the processing of the text interaction for logistics queries. Assume that a customer service agent can process in parallel up to 4 text interactions for logistics queries, the customer service agent cannot process in parallel 4 text interactions for comments and complaints.

In view of the above situation, in an implementation of the present specification, weight setting is used in response to that the processing volume upper limit is set, and the processing volume corresponding to different types of text interactions is distinguished by setting different weights for different types of text interactions. For example, the total weight of the text interactions of the customer service agent is a sum of weights of all text interactions currently being processed by the customer service agent, different types of text interactions having different weights; in response to that the traffic request is an audio interaction request or a video interaction request and that the customer service agent is currently processing neither an audio interaction nor a video interaction, whether a processing volume corresponding to a text interaction being processed by the customer service agent exceeds the first processing volume upper limit is determined based on whether the total weight of text interactions of the customer service agent exceeds the upper limit of a first text interaction weight in the first processing volume upper limit; in response to that the traffic request is a text interaction request and that the customer service agent is currently processing an audio interaction or a video interaction, whether a sum of a processing volume corresponding to a text interaction corresponding to the traffic request and a processing volume corresponding to a text interaction being processed by the customer service agent exceeds the first processing volume upper limit is determined based on whether a sum of the total weight of text interactions of the customer service agent and the weight of text interactions corresponding to the traffic request exceeds the upper limit of the first text interaction weight in the first processing volume upper limit; and in response to that the traffic request is a text interaction request and that the customer service agent is currently processing neither an audio interaction nor a video interaction, whether a sum of a processing volume corresponding to a text interaction corresponding to the traffic request and a processing volume corresponding to a text interaction being processed by the customer service agent exceeds the second processing volume upper limit is determined based on whether a sum of the total weight of the text interactions of the customer service agent and the weight of text interactions corresponding to the traffic request exceeds the second text interaction weight in the second processing volume upper limit.

For example, assume that text interactions can be divided into search types (for example, text interactions such as logistics information query and preferential information query that only require the customer service agent to search and forward information) and record types (for example, text interactions such as comments and complaints and customer information modification that require a customer to obtain, verify and record information).

Assume that the customer service agent can process in parallel up to 2 record type text interactions when processing an audio interaction or a video interaction, and the customer service agent can process in parallel up to 4 search-type text interactions when processing an audio interaction or a video interaction; the customer service agent can process in parallel up to 4 record type text interactions when processing neither an audio interaction nor a video interaction, and the customer service agent can process in parallel up to 8 search type text interactions when processing an audio interaction or a video interaction. The weight value corresponding to 1 record type text interaction is set to 2, the weight value corresponding to 1 search type text interaction is set to 1, the upper limit of the first text interaction weight in the first processing volume upper limit to 4, and the weight value of the second text interactions in the second processing volume upper limit is set to 8.

Assume that there is a new audio interaction, in response to that the customer service agent is currently processing an audio interaction or a video interaction, the customer service agent does not have the capability of processing the new audio interaction, and does not meet the response need of the traffic request; in response to that there is no audio interaction or video interaction currently being processed by the customer service agent but the customer service agent is processing 4 record type text interactions in parallel, the processing volume (a total weight value of 8) corresponding to text interactions processed by the customer service agent exceeds the first processing volume upper limit (a weight value of 4), so the customer service agent still does not have the capability of processing new audio interactions, and does not meet the response need of the traffic request; in response to that there is no audio interaction or video interaction currently being processed by the customer service agent but the customer service agent is processing 4 search type text interactions in parallel, the processing volume (a total weight value of 4) corresponding to text interactions processed by the customer service agent does not exceed the first processing volume upper limit (a weight value of 4), so the customer service agent still has the capability of processing new audio interactions, and meets the response need of the traffic request; and in response to that there is no audio interaction or video interaction currently being processed by the customer service agent, and the customer service agent is processing 2 search type text interactions and 1 record type text interaction in parallel, the processing volume (a total weight value of 4) corresponding to text interactions processed by the customer service agent does not exceed the first processing volume upper limit (a weight value of 4), so the customer service agent still has the capability of processing new audio interactions and meets the response need of the traffic request.

Assume that there is a new search type text interaction currently, in response to that the customer service agent is processing an audio interaction or a video interaction, and the customer service agent is processing 1 record type text interaction in parallel at the same time, a sum of the processing volume (a weight value of 1) corresponding to the text interaction corresponding to the traffic request and the processing volume (a weight value of 2) corresponding to the text interaction being processed by the customer service agent does not exceed the first processing volume upper limit (a weight value of 4), so the customer service agent has the capability of processing new audio interactions and meets the response need of the traffic request; in response to that the customer service agent is currently processing an audio interaction or a video interaction, and is processing 1 record type text interaction and 2 search type text interactions in parallel at the same time, a sum of the processing volume (a weight value of 1) corresponding to the text interaction corresponding to the traffic request and the processing volume (a weight value of 4) corresponding to the text interactions being processed by the customer service agent exceeds the first processing volume upper limit (a weight value of 4), so the customer service agent does not have the capability of processing new audio interactions and does not meet the response need of the traffic request; in response to that the customer service agent is currently processing neither an audio interaction nor a video interaction, and is processing 7 search type text interactions in parallel at the same time, a sum of the processing volume (a weight value of 1) corresponding to the text interaction corresponding to the traffic request and the processing volume (a weight value of 7) corresponding to the text interactions being processed by the customer service agent does not exceed the second processing volume upper limit (a weight value of 8), so the customer service agent has the capability of processing new audio interactions and meets the response need of the traffic request; and in response to that the customer service agent is currently processing neither an audio interaction nor a video interaction, and the customer service agent is processing 4 record type text interactions in parallel at the same time, a sum of the processing volume (a weight value of 1) corresponding to the text interaction corresponding to the traffic request and the processing volume (a weight value of 8) corresponding to the text interaction being processed by the customer service agent exceeds the second processing volume upper limit (a weight value of 8), so the customer service agent does not have the capability of processing new audio interactions and does not meet the response need of the traffic request.

Further, in an implementation of the present specification, audio interactions and video interactions are uniformly set in response to that the processing volume upper limit is set. That is, the first processing volume upper limit includes the upper limit of an audio and video text processing volume, and the upper limit of the audio and video text processing volume is invoked in response to that the first processing volume upper limit is invoked.

Further, in some application scenarios, the customer service agent effort required to process an audio interaction is different from that required to process a video interaction. For example, assume that a customer service agent can process 2 text interactions in parallel while processing an audio interaction. In response to that an audio interaction is processed, the customer service agent also needs to pay attention to a video image on the screen when processing a video interaction. The customer service agent can only process 1 text interaction while processing the audio interaction. Therefore, in an implementation of the present specification, audio interactions and video interactions are separately set in response to that the processing volume upper limit is set. That is, the first processing volume upper limit includes the upper limit of an audio text processing volume, and the corresponding upper limit is invoked based on a current application scenario in response to that the first processing volume upper limit is invoked.

For example, assume that the customer service agent can process up to 2 text interactions in parallel when processing an audio interaction, can process up to 1 text interaction in parallel when processing a video interaction, and can process up to 4 text interactions in parallel when processing neither an audio interaction and a video interaction, then upper limit of the audio text processing volume in the first processing volume upper limit is set to 2, the upper limit of the video text processing volume in the first processing volume upper limit is set to 1, and the second number of text interactions in the second processing volume upper limit is set to 4.

Assume that there is a new audio interaction or video interaction, in response to that the customer service agent is currently processing an audio interaction or a video interaction, the customer service agent does not have the capability of processing the new audio interaction, and does not meet the response need of the traffic request; in response to that new traffic is a video interaction, there is no audio interaction or video interaction currently being processed by the customer service agent but the customer service agent is processing 2 text interactions in parallel, the processing volume (2 text interactions) corresponding to text interactions processed by the customer service agent exceeds the upper limit of the video text processing volume (1 text interaction), so the customer service agent does not have the capability of processing new video interactions, and does not meet the response need of the traffic request; and in response to that new traffic is an audio interaction, there is no audio interaction or video interaction currently being processed by the customer service agent, and the customer service agent is processing 2 text interactions in parallel, the processing volume (2 text interactions) corresponding to text interactions processed by the customer service agent does not exceed the upper limit of the audio text processing volume (2 text interactions), so the customer service agent has the capability of processing the new audio interaction and meets the response need of the traffic request.

Assume that there is a new text interaction currently, in response to that the customer service agent is processing an audio interaction, and is processing 1 text interaction in parallel at the same time, a sum of the processing volume (1 text interaction) corresponding to the text interaction corresponding to the traffic request and the processing volume (1 text interaction) corresponding to the text interaction being processed by the customer service agent does not exceed the upper limit of the audio text processing volume (2 text interactions), so the customer service agent has the capability of processing the new text interaction and meets the response need of the traffic request; in response to that the customer service agent is currently processing a video interaction, and is processing 1 text interaction in parallel, a sum of the processing volume (1 text interaction) corresponding to the text interaction corresponding to the traffic request and the processing volume (1 text interaction) corresponding to the text interaction being processed by the customer service agent exceeds the upper limit of the video text processing volume (1 text interaction), so the customer service agent does not have the capability of processing the new text interaction and does not meet the response need of the traffic request.

Further, in an implementation of the present specification, in the process of determining one or more customer service agents that meet the response need of the traffic request, all customer service agents that meet the response need among the customer service agents that are in an enabled state are determined; and in the process of allocating the telecommunication traffic corresponding to the traffic request to one of the one or more customer service agents that meet the response need, the traffic corresponding to the traffic request is allocated to a customer service agent having a highest traffic processing priority among all the customer service agents that meet the response need.

For example, in an implementation, the traffic processing priority of the customer service agent is set based on a professional score of the customer service agent. When the professional score is higher, the traffic processing priority is higher.

For example, in an implementation, the traffic processing priority of the customer service agent is set based on the current traffic processing volume of the customer service agent. When the current traffic processing volume of the customer service agent is lower, the traffic processing priority is higher.

Figure 3:
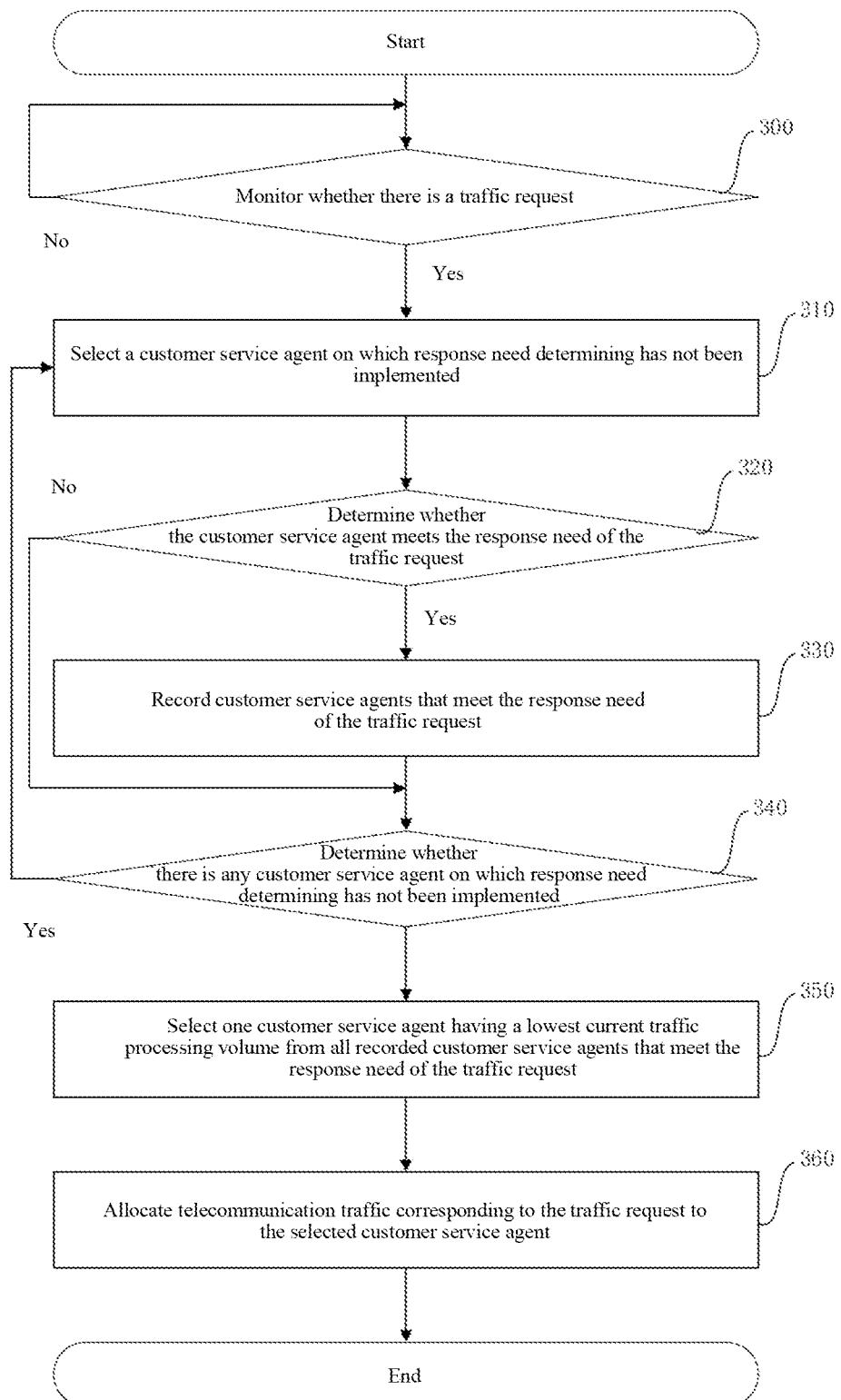
FIG. 3 illustrates a flowchart illustrating an implementation of a telecommunication traffic allocation method according to the present specification.

FIG. 3 illustrates a flowchart illustrating an implementation of a telecommunication traffic allocation method according to the present specification. As shown in FIG. 3, in an implementation of the present specification, the telecommunication traffic allocation method includes the following processes.

Step 300: Monitor whether there is a traffic request; perform step 300 in response to that there is no traffic request; and perform step 310 in response to a traffic request.

Step 310: Select a customer service agent on which response need determining has not been implemented.

Step 320: Determine whether the customer service agent meets a response need of the traffic request; perform step 330 in response to that the customer service agent meets the response need; and perform step 340 in response to that the customer service agent does not meet the response need.

Step 330: Record customer service agents that meet the response need of the traffic request.

Step 340: Determine whether there is any customer service agent on which response need determining has not been implemented among enabled customer service agents; perform step 310 in response to that there is such a customer service agent; and perform step 350 in response to that there is no such customer service agent.

Step 350: Select one customer service agent having a lowest current traffic processing volume from all recorded customer service agents that meet the response need of the traffic request.

Step 360: Allocate telecommunication traffic corresponding to the traffic request to the customer service agent selected in step 360.

Further, in an implementation of the present specification, whether the customer service agents in the enabled state meet the response need is determined one by one according to a predetermined sequence, and the telecommunication traffic corresponding to the traffic request is allocated to the first customer service agent determined as meeting the response need. For example, the traffic processing priority of the customer service agent is set based on a professional score of the customer service agent. When the professional score is higher, the traffic processing priority is higher. Whether the customer service agents in the enabled state meet the response need is determined one by one based on the traffic processing priority from high to low, and the telecommunication traffic corresponding to the traffic request is allocated to the first customer service agent determined as meeting the response need.

Figure 4:
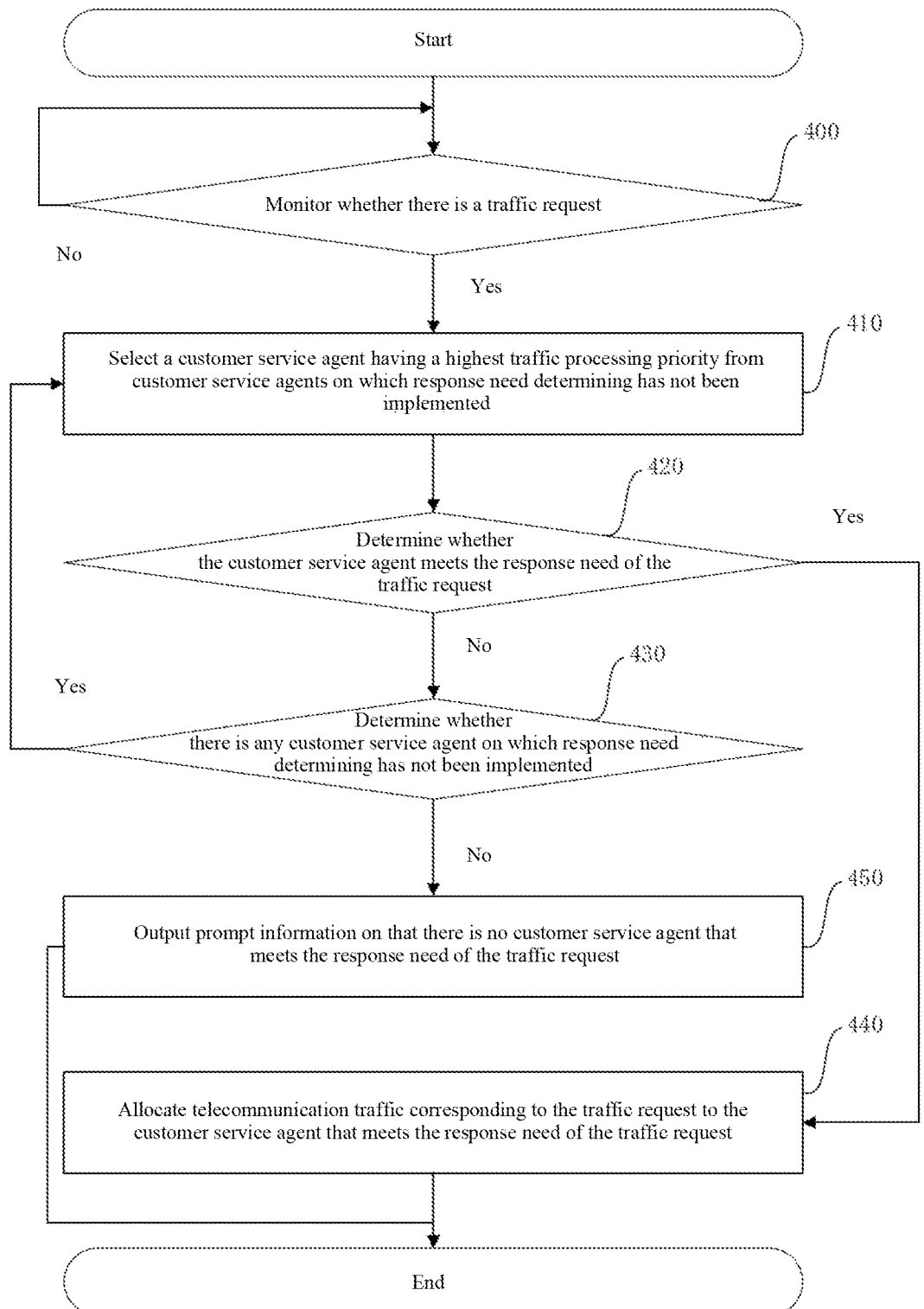
FIG. 4 illustrates a flowchart illustrating an implementation of a telecommunication traffic allocation method according to the present specification.

FIG. 4 illustrates a flowchart illustrating an implementation of a telecommunication traffic allocation method according to the present specification. As shown in FIG. 4, in an implementation of the present specification, the telecommunication traffic allocation method includes the following processes.

Step 400: Monitor whether there is a traffic request; perform step 400 in response to that there is no traffic request; perform step 410 in response to a traffic request.

Step 410: Select the customer service agent having a highest traffic processing priority from the enabled customer service agents on which response need determining has not been implemented. Step 420: Determine whether the customer service agent meets a response need of the traffic request; perform step 430 in response to that the customer service agent does not meet the response need; and perform step 440 in response to that the customer service agent meets the response need.

Step 430: Determine whether there is any customer service agent on which response need determining has not been implemented among enabled customer service agents; perform step 410 in response to that there is such a customer service agent; and perform step 450 in response to that there is no such customer service agent.

Step 440: Allocate telecommunication traffic corresponding to the traffic request to the customer service agent that meets the response need of the traffic request.

Step 450: Output prompt information on that there is no customer service agent that meets the response need of the traffic request.

Further, in practice, there are designated customer service agents for certain traffic requests. For example, when customer A is in text interaction with customer service agent B, in response to that customer A wants to be further in video interaction with customer service agent B, a designated customer service agent for the newly initiated video interaction request is customer service agent B. For another example, customer A had a traffic interaction with customer service agent B, and is satisfied with customer service agent B in the service. Therefore, when customer A initiates the current traffic interaction to designate customer service agent B to continue the service, the designated customer service agent for the newly initiated traffic request is customer service agent B.

For the case of a designated customer service agent, in an implementation of the present specification, before one or more customer service agents that meet the response need of the traffic request are determined, it is first necessary to determine whether there is a designated customer service agent for the traffic request. For example, before one or more customer service agents that meet the response need of the traffic request are determined: in response to a traffic request, it is determined whether there is a designated customer service agent for the traffic request; in response to that there is a designated customer service agent, it is determined whether the designated customer service agent meets the response need; and in response to that the designated customer service agent meets the response need, the telecommunication traffic corresponding to the traffic request is allocated to the designated customer service agent.

Further, in an implementation of the present specification, before one or more customer service agents that meet the response need of the traffic request are determined, in response to that a designated customer service agent does not meet the response need, a waiting request and/or a customer service agent replacement request is initiated. For example, a waiting request is initiated, waiting for the designated customer service agent to complete the audio interaction, and/or the video interaction, and/or the text interaction currently being processed, and then the telecommunication traffic corresponding to the traffic request is allocated to the designated customer service agent after the designated customer service agent meets the response need. For another example, a customer service agent replacement request is initiated, prompting the customer that the designated customer service agent is busy, and requesting the customer to replace the designated customer service agent.

Figure 5:
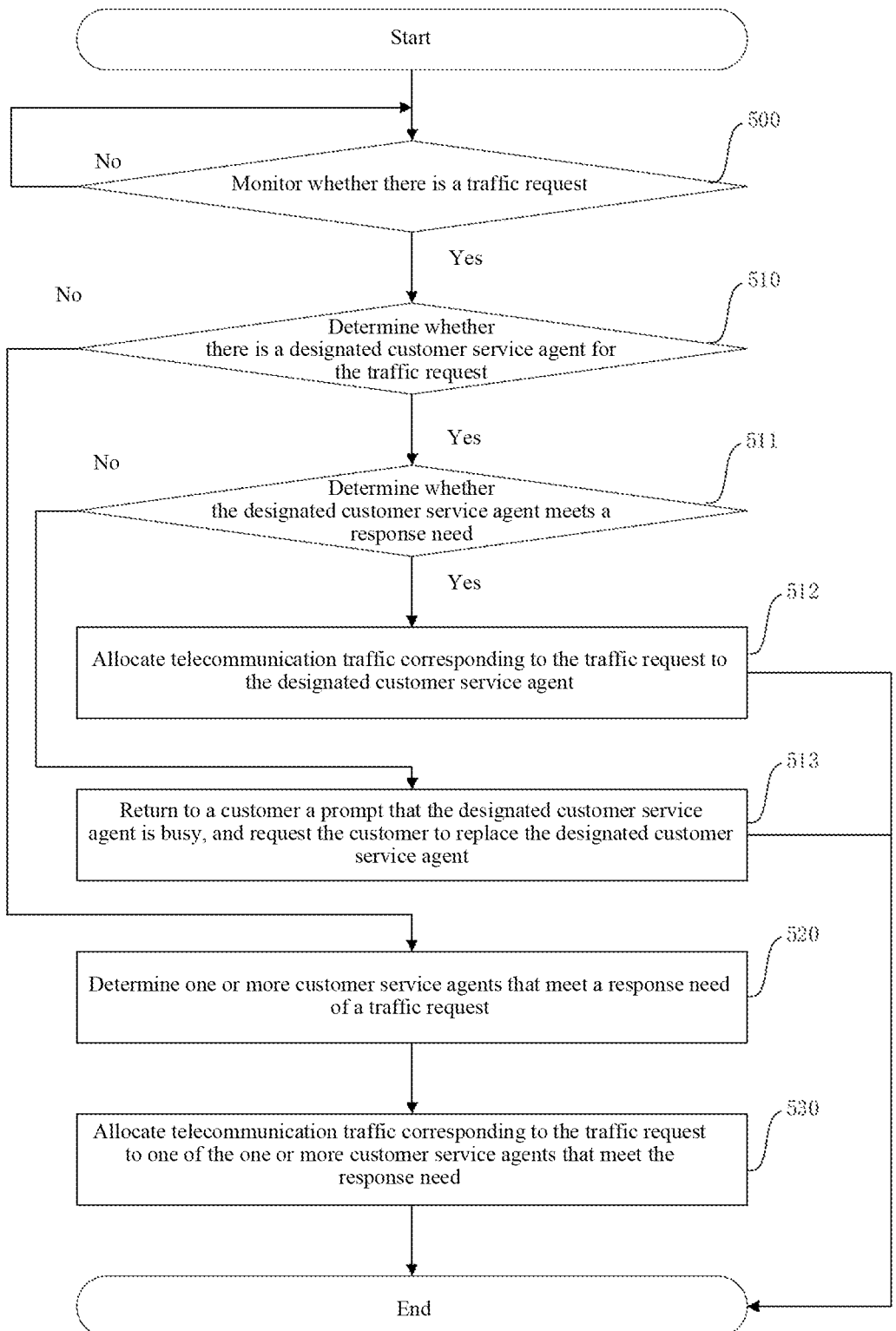
FIG. 5 illustrates a flowchart illustrating an implementation of a telecommunication traffic allocation method according to the present specification.

FIG. 5 illustrates a flowchart illustrating an implementation of a telecommunication traffic allocation method according to the present specification. As shown in FIG. 5, in an implementation of the present specification, the telecommunication traffic allocation method includes the following processes.

Step 500: Monitor whether there is a traffic request; perform step 500 in response to that there is no traffic request; and perform step 510 in response to a traffic request.

Step 510: Determine whether there is a designated customer service agent for the traffic request; and perform step 511 in response to that there is a designated customer service agent.

Step 511: Determine whether the designated customer service agent meets a response need; in response to that the designated customer service agent meets the response need, perform step 512, and allocate telecommunication traffic corresponding to the traffic request to the designated customer service agent; in response to that the designated customer service agent does not meet the response need, perform step 513, return to a customer a prompt that the designated customer service agent is busy, and request the customer to replace the designated customer service agent; and perform step 520 in response to that there is no designated customer service agent.

Step 520: Determine one or more customer service agents that meet the response need of the traffic request.

Step 530: Allocate telecommunication traffic corresponding to the traffic request to one of the one or more customer service agents that meet the response need.

It can be understood that some or all of the steps or operations in the above implementations are only examples, and the implementations of the present specification can also perform other operations or various operation variations. In addition, the steps can be performed in a different order presented in the above implementations, and it may not be necessary to perform all operations in the above implementations.

Figure 6:
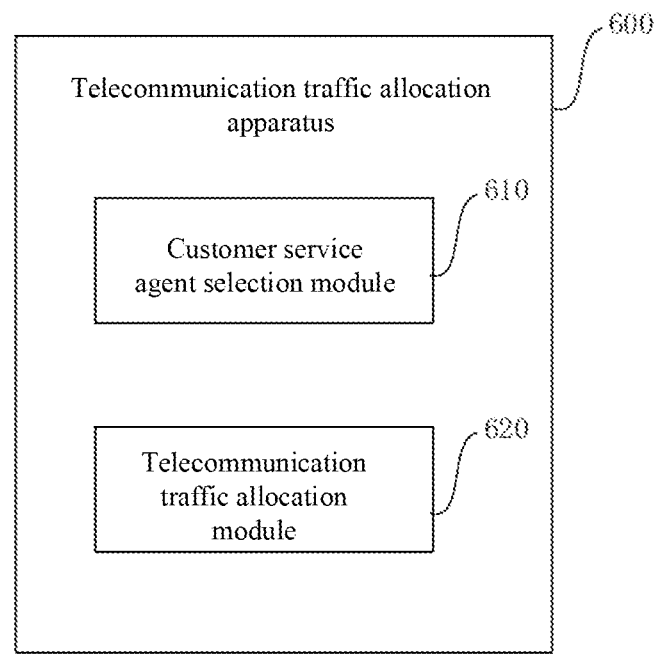
FIG. 6 illustrates a structural diagram illustrating an implementation of a telecommunication traffic allocation apparatus according to the present specification.

Further, based on the telecommunication traffic allocation method proposed in an implementation of the present specification, an implementation of the present specification also proposes a telecommunication traffic allocation apparatus. FIG. 6 illustrates a structural diagram illustrating an implementation of a telecommunication traffic allocation apparatus according to the present specification. In an implementation of the present specification, as shown in FIG. 6, a telecommunication traffic allocation apparatus 600 includes: a customer service agent selection module 610, configured to determine a customer service agent that meets a response need of a traffic request, including: a first determining sub-module, configured to, in response to that the traffic request is an audio interaction request or a video interaction request and that the customer service agent is currently processing an audio interaction or a video interaction, determine that a customer service agent does not meet the response need of the traffic request; a second determining sub-module, configured to, in response to that the traffic request is an audio interaction request or a video interaction request and that the customer service agent is currently processing neither an audio interaction nor a video interaction, invoke a predetermined first processing volume upper limit, and determine that the customer service agent meets the response need of the traffic request in response to that a processing volume corresponding to a text interaction being processed by the customer service agent does not exceed the first processing volume upper limit; and a telecommunication traffic allocation module 620, configured to allocate telecommunication traffic corresponding to the traffic request to one of the one or more customer service agents that meet the response need.

The implementations of the present specification are described in a progressive way. For same or similar parts of the implementations, mutual references can be made to the implementations. Each implementation focuses on a difference from the other implementations. Particularly, an apparatus implementation is similar to a method implementation, and therefore is described briefly. For related parts, references can be made to some descriptions in the method implementation. A person skilled in the art can clearly understand that for convenience and conciseness of description, for the specific working processes of the apparatus and units described above, references can be made to the corresponding processes in the above method implementations. Details are omitted herein for simplicity.

Furthermore, in the 1990s, the improvement of a technology could be clearly distinguished between hardware improvements (for example, improvements to circuit structures of diodes, transistors, switches, etc.) or software improvements (improvements to method flows). However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (such as a field programmable gate array (FPGA)) is such an integrated circuit having a logic function determined by a visitor's programming of the device. It is programmed by a designer to "integrate" a digital apparatus on a PLD without requiring a chip manufacturer to design and manufacture a dedicated integrated circuit chip. Moreover, nowadays, instead of manually making integrated circuit chips, this kind of programming is mostly implemented by using "logic compiler" software, which is similar to a software compiler used in program development and writing, but original code before compiling has to be written in a specific programming language, which is called a hardware description language (HDL). There are many HDLs rather than one HDL, such as advanced Boolean expression language (ABEL), Altera hardware description language (AHDL), Confluence, Cornell University programming language (CUPL), HDCal, Java Hardware Description Language (JHDL), Lava, Lola, MyHDL, PALASM, and Ruby Hardware Description Language (RHDL). Currently, the most commonly used HDLs are very-high-speed integrated circuit hardware description language (VHDL) and Verilog. A person skilled in the art should also understand that a hardware circuit that implements a logical method procedure can be readily obtained once the method procedure is logically programmed by using the several described hardware description languages and is programmed into an integrated circuit.

The controller can be implemented in any suitable way. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, a built-in microprocessor, etc. Examples of the controller include, but are not limited to, the following microcontrollers: ARC625D, Atmel AT91SAM, MicrochipPIC 18F26K20 and Silicone LabsC8051F320v. The memory controller can also be implemented as a part of the memory control logic. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

In the description of the implementations of the present specification, for the convenience of description, the apparatus is divided into various modules/units based on function and described separately, and the division of the modules/units is only a division of logic functions. When the implementations of the present specification are implemented, the functions of the modules/units can be implemented in the same or a plurality of software and/or hardware.

For example, the apparatus proposed in the implementations of the present specification can be fully or partially integrated into a physical entity during actual implementation, or can be physically separated. These modules can all be implemented in the form of software invoked by processing elements; or can be implemented in the form of hardware; or some modules can be implemented in the form of software invoked by the processing elements, and some of the modules can be implemented in the form of hardware. For example, a detection module can be a separately established processing element, or can be implemented by being integrated in a certain chip of the electronic device. The implementation of other modules is similar. In addition, all or some of these modules can be integrated together or implemented independently. In the implementation process, each step of the above method or the above modules can be completed by an integrated logic circuit of hardware in the processor element or instructions in the form of software.

For example, the above modules can be one or more integrated circuits configured to implement the above methods, for example: one or more application specific integrated circuits (ASICs), or one or more digital signal processors (DSPs), or, one or more field programmable gate arrays (FPGAs). For another example, these modules can be integrated together and implemented in the form of a system on chip (SOC).

Those of ordinary skill in the art can be aware that the units and algorithm steps described in the implementations of the present specification can be implemented by using electronic hardware or a combination of computer software and electronic hardware. Whether these functions are performed in the form of hardware or software depends on specific applications and design constraints of the technical solutions. A person skilled in the art can use different methods for each specific application to implement the described functions, but such implementations should not be considered to be beyond the scope of the present specification.

An implementation of the present specification further provides an electronic device, including a memory for storing computer program instructions and a processor for executing the program instructions, where when the computer program instructions are executed by the processor, the electronic device is triggered to perform the steps of the method according to the implementations of the present specification.

For example, in an implementation of the present specification, the above one or more computer programs are stored in the above memory, and the above one or more computer programs include instructions. When the above instructions are executed by the above device, the above device is caused to perform the steps of the methods described in the implementations of the present specification.

The present specification can be described in the general context of computer executable instructions executed by a computer, for example, a program module. Generally, the program module includes a routine, a program, an object, a component, a data structure, etc., executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

For example, in an implementation of the present specification, the processor of the electronic device can be a system on chip (SOC), and the processor can include a central processing unit (CPU), and can further include other types of processors. For example, in an implementation of the present specification, the processor of the electronic device can be a PWM control chip.

For example, in an implementation of the present specification, the processor involved can include, for example, a CPU, a DSP, a microcontroller, or a digital signal processor, and can also include a GPU, embedded neural-network processor units (NPU), and an image signal processor (ISP). The processor can also include necessary hardware accelerators or logic processing hardware circuits, such as ASICs, or one or more integrated circuits configured to control the execution of programs of the technical solutions of the present specification, etc. In addition, the processor can have a function of operating one or more software programs, and the software programs can be stored in a storage medium.

For example, in an implementation of the present specification, the memory of the electronic device can be a read-only memory (ROM), other types of static storage devices that can store static information and instructions, a random access memory (RAM) or other types of dynamic storage devices that can store information and instructions, or the memory can be an electrically erasable programmable read-only memory (EEPROM), a compact disc read-only memory, CD-ROM) or other optical disc storage, optical disc storage (including compact discs, laser discs, optical discs, digital versatile discs, Blu-ray discs, etc.), magnetic disk storage media or other magnetic storage devices, or can be any computer-readable medium that can be configured to include or store desired program code with an instruction or data structure form and can be accessed by a computer.

For example, in an implementation of the present specification, the processor and the memory can be combined into a processing apparatus, and more commonly are components independent of each other. The processor is configured to execute the program code stored in the memory so as to implement the method described in the implementation of the present specification. During specific implementation, the memory can also be integrated in the processor, or independent of the processor.

Further, the devices, apparatuses, modules or units illustrated in the implementations of the present specification can be implemented by computer chips or entities, or by products with certain functions.

Those skilled in the art should understand that the implementations of the present specification can be provided as a method, an apparatus, or a computer program product. Therefore, the present specification can take a form of complete hardware implementations, complete software implementations, or implementations combining software and hardware. Moreover, the present disclosure can use a form of a computer program product that is implemented on one or more computer-usable storage media that include computer-usable program code.

In several implementations of the present specification, any function, if implemented in the form of a software function unit and sold or used as a standalone product, can be stored in a computer-readable storage medium. Based on such understanding, the technical solution of the present specification which is essential or a part contributing to the existing technologies or a part of the technical solution can be embodied in the form of a software product, the computer software product is stored in a storage medium and includes a plurality of instructions for causing a computer device (which can be a personal computer, a server, or a network device) to execute all or some steps of the method according to each implementation of the present specification.

For example, an implementation of the present specification further provides a computer-readable storage medium storing a computer program, where when the computer program runs on a computer, the computer is caused to perform the method provided according to the implementation of the present specification.

An implementation of the present specification also provides a computer program product, where the computer program product includes a computer program that, when running on a computer, causes the computer to perform the method provided according to the implementation of the present specification.

The implementations of the present specification are described with reference to flowcharts and/or block diagrams of methods, devices (apparatuses), and computer program products according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It should also be noted that in the implementations of the present specification, "at least one" refers to one or more, and "a plurality of" refers to two or more. "And/or" is an association relation describing associated objects, which means that there can be three relations, for example, A and/or B can represent three situations: A exists alone, both A and B exist, and B exists alone. A and B can be singular or plural. In addition the character "/" generally indicates that the associated objects before and after the character are in an "or" relation. "The following at least one" and similar expressions refer to any combination of these items, including any combination of single items or plural items. For example, at least one of a, b, and c can represent: a, b, c, a and b, a and c, b and c, or a and b and c, where a, b, and c can be single, or can be more.

In implementations of the present specification, the term "comprise", "include", or any other variant thereof is intended to encompass a non-exclusive inclusion, so a process, method, product, or device that includes a series of elements includes not only those elements, but also other elements not explicitly listed, or elements that are inherent to such a process, method, product, or device. An element described by "includes a . . . " further includes, without more constraints, another identical element in the process, method, product, or device that includes the element.

The above descriptions are only specific implementations of the present specification. Any person skilled in art can easily conceive of variations or replacements within the technical scope disclosed in the present specification, and the variations or replacements should fall within the protection scope of the present specification. The protection scope of the present specification should be subject to the protection scope of the claims.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A telecommunication traffic allocation method, comprising:
   receiving a communication request;
   automatically determining, by a computing machine, a customer service agent to allocate telecommunication traffic corresponding to the communication request, including:
      in response to that the communication request is for an audio interaction or a video interaction and that a first customer service agent is currently processing an audio interaction or a video interaction, determining that the first customer service agent does not meet a threshold for serving a traffic request;
      in response to that the communication request is for an audio interaction or a video interaction and that a second customer service agent is currently processing neither an audio interaction nor a video interaction, and a processing volume corresponding to a text interaction being processed by the second customer service agent does not exceed a first processing volume upper limit, determining that the second customer service agent meets the threshold for serving the communication request; and
      in response to that the communication request is for a text interaction and that a third customer service agent is currently processing an audio interaction or a video interaction, invoking the first processing volume upper limit, and determining that the third customer service agent meets the threshold for serving the communication request in response to that a sum of a processing volume corresponding to the text interaction of the communication request and a processing volume corresponding to a text interaction currently being processed by the third customer service agent does not exceed the first processing volume upper limit; and
   allocating the telecommunication traffic corresponding to the communication request to a customer service agent that meets the threshold for serving the communication request.

2. The method according to claim 1, further comprising:
   in response to that the communication request is for a text interaction and that a fourth customer service agent is currently processing neither an audio interaction nor a video interaction, invoking a second processing volume upper limit, and determining that the fourth customer service agent meets the threshold for serving the communication request in response to that a sum of a processing volume corresponding to the text interaction of the communication request and a processing volume corresponding to a text interaction currently being processed by the fourth customer service agent does not exceed the second processing volume upper limit.

3. The method according to claim 1, wherein the first processing volume upper limit includes an upper limit of a text processing volume in parallel with an audio interaction and an upper limit of a text processing volume in parallel with a video interaction.

4. The method according to claim 1, wherein
   the first processing volume upper limit includes a first upper limit of a number of text interactions, and
   in response to that the communication request is for an audio interaction or a video interaction and that the customer service agent is currently processing neither an audio interaction nor a video interaction, the determining whether the processing volume corresponding to a text interaction being processed by the second customer service agent exceeds the first processing volume upper limit includes determining whether a number of all text interaction being processed by the second customer service agent exceeds the first upper limit.

5. The method according to claim 1, wherein the first processing volume upper limit includes a first upper limit of a text interaction weight, and comprising:
   in response to that the communication request is for an audio interaction or a video interaction and that the second customer service agent is currently processing neither an audio interaction nor a video interaction, determining whether the processing volume corresponding to the text interaction being processed by the second customer service agent exceeds the first processing volume upper limit based on determining whether a total weight of the text interaction of the customer service agent exceeds the first upper limit of the text interaction weight, wherein the total text interaction weight of the second customer service agent is a sum of weight of all text interaction currently being processed by the second customer service agent, different types of text interactions having different weights.

6. The method according to claim 1, wherein the allocating the telecommunication traffic corresponding to the communication request to a customer service agent that meets the threshold includes:
   determining all customer service agents that meet the threshold among customer service agents in an enabled state; and
   allocating the telecommunication traffic corresponding to the communication request to a customer service agent having a highest traffic processing priority among all the customer service agents that meet the threshold.

7. The method according to claim 1, wherein the allocating the telecommunication traffic corresponding to the communication request to a customer service agent that meets the threshold includes:
determining whether customer service agents in an enabled state meet the threshold one by one in a sequence; and
allocating telecommunication traffic corresponding to the communication request to a first customer service agent determined as meeting the threshold in the sequence.

8. The method according to claim 1, further comprising:
before the allocating the telecommunication traffic corresponding to the communication request to a customer service agent that meets the threshold, determining whether there is a designated customer service agent for the communication request;
in response to that there is a designated customer service agent for the communication request, determining whether the designated customer service agent meets the threshold; and
in response to that the designated customer service agent meets a response need, allocating the telecommunication traffic corresponding to the communication request to the designated customer service agent.

9. The method according to claim 8, further comprising:
initiating one or more of a waiting request or a customer service agent replacement request in response to that the designated customer service agent does not meet the threshold.

10. The method according to claim 1, wherein the first processing volume upper limit includes an upper limit of a text processing volume in parallel with an audio or video text processing volume.

11. An electronic device, comprising a memory for storing computer program instructions and a processor for executing the program instructions, wherein when the computer program instructions are executed by the processor, the processor is configured to perform acts including:
receiving a communication request;
automatically determining a customer service agent to allocate telecommunication traffic corresponding to the communication request, including:
in response to that the communication request is for an audio interaction or a video interaction and that a first customer service agent is currently processing an audio interaction or a video interaction, determining that the first customer service agent does not meet a threshold for serving a traffic request;
in response to that the communication request is for an audio interaction or a video interaction and that a second customer service agent is currently processing neither an audio interaction nor a video interaction, and a processing volume corresponding to a text interaction being processed by the second customer service agent does not exceed a first processing volume upper limit, determining that the second customer service agent meets the threshold for serving the communication request; and
in response to that the communication request is for a text interaction and that a third customer service agent is currently processing an audio interaction or a video interaction, invoking the first processing volume upper limit, and determining that the third customer service agent meets the threshold for serving the communication request in response to that a sum of a processing volume corresponding to the text interaction of the communication request and a processing volume corresponding to a text interaction currently being processed by the third customer service agent does not exceed the first processing volume upper limit; and
allocating the telecommunication traffic corresponding to the communication request to a customer service agent that meets the threshold for serving the communication request.

12. The device according to claim 11, wherein the acts further include:
in response to that the communication request is for a text interaction and that a fourth customer service agent is currently processing neither an audio interaction nor a video interaction, invoking a second processing volume upper limit, and determining that the fourth customer service agent meets the threshold for serving the communication request in response to that a sum of a processing volume corresponding to the text interaction of the communication request and a processing volume corresponding to a text interaction currently being processed by the fourth customer service agent does not exceed the second processing volume upper limit.

13. The device according to claim 11, wherein the first processing volume upper limit includes an upper limit of a text processing volume in parallel with an audio interaction and an upper limit of a text processing volume in parallel with a video interaction.

14. The device according to claim 11, wherein the first processing volume upper limit includes an upper limit of a text processing volume in parallel with an audio or video text processing volume.

15. The device according to claim 11, wherein the first processing volume upper limit includes a first upper limit of a number of text interactions, and
in response to that the communication request is for an audio interaction or a video interaction and that the customer service agent is currently processing neither an audio interaction nor a video interaction, the determining whether the processing volume corresponding to a text interaction being processed by the second customer service agent exceeds the first processing volume upper limit includes determining whether a number of all text interaction being processed by the second customer service agent exceeds the first upper limit.

16. The device according to claim 11, wherein
the first processing volume upper limit includes a first upper limit of a text interaction weight, and
the acts include:
in response to that the communication request is for an audio interaction or a video interaction and that the second customer service agent is currently processing neither an audio interaction nor a video interaction, determining whether the processing volume corresponding to the text interaction being processed by the second customer service agent exceeds the first processing volume upper limit based on determining whether a total weight of the text interaction of the customer service agent exceeds the first upper limit of the text interaction weight, wherein the total text interaction weight of the second customer service agent is a sum of weight of all text interaction currently being processed by the second customer service agent, different types of text interactions having different weights.

17. A non-transitory computer-readable storage medium storing a computer program, wherein in response to that the computer program runs on a computer, the computer is caused to perform acts including:
   receiving a communication request;
   automatically determining a customer service agent to allocate telecommunication traffic corresponding to the communication request, including:
      in response to that the communication request is for an audio interaction or a video interaction and that a first customer service agent is currently processing an audio interaction or a video interaction, determining that the first customer service agent does not meet a threshold for serving a traffic request;
      in response to that the communication request is for an audio interaction or a video interaction and that a second customer service agent is currently processing neither an audio interaction nor a video interaction, and a processing volume corresponding to a text interaction being processed by the second customer service agent does not exceed a first processing volume upper limit, determining that the second customer service agent meets the threshold for serving the communication request; and
      in response to that the communication request is for a text interaction and that a third customer service agent is currently processing an audio interaction or a video interaction, invoking the first processing volume upper limit, and determining that the third customer service agent meets the threshold for serving the communication request in response to that a sum of a processing volume corresponding to the text interaction of the communication request and a processing volume corresponding to a text interaction currently being processed by the third customer service agent does not exceed the first processing volume upper limit; and
   allocating the telecommunication traffic corresponding to the communication request to a customer service agent that meets the threshold for serving the communication request.

18. The storage medium according to claim 17, wherein the allocating the telecommunication traffic corresponding to the communication request to a customer service agent that meets the threshold includes:
   determining all customer service agents that meet the threshold among customer service agents in an enabled state; and
   allocating the telecommunication traffic corresponding to the communication request to a customer service agent having a highest traffic processing priority among all the customer service agents that meet the threshold.

19. The storage medium according to claim 17, wherein the acts further include:
   in response to that the communication request is for a text interaction and that a fourth customer service agent is currently processing neither an audio interaction nor a video interaction, invoking a second processing volume upper limit, and determining that the fourth customer service agent meets the threshold for serving the communication request in response to that a sum of a processing volume corresponding to the text interaction of the communication request and a processing volume corresponding to a text interaction currently being processed by the fourth customer service agent does not exceed the second processing volume upper limit.

20. The storage medium according to claim 17, wherein:
   the first processing volume upper limit includes a first upper limit of a number of text interactions; and
   in response to that the communication request is for an audio interaction or a video interaction and that the customer service agent is currently processing neither an audio interaction nor a video interaction, the determining whether the processing volume corresponding to a text interaction being processed by the second customer service agent exceeds the first processing volume upper limit includes determining whether a number of all text interaction being processed by the second customer service agent exceeds the first upper limit.

* * * * *